US010313359B2

(12) United States Patent
Ruhlen et al.

(10) Patent No.: US 10,313,359 B2
(45) Date of Patent: Jun. 4, 2019

(54) PROTOCOLS FOR ACCESSING HOSTS

(71) Applicant: Microsoft Technology Licensing, LLC, Redmond, WA (US)

(72) Inventors: Matthew J. Ruhlen, Redmond, WA (US); Christopher J. Brown, Redmond, WA (US); Tyler W. Butler, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 15/340,867

(22) Filed: Nov. 1, 2016

(65) Prior Publication Data

US 2018/0124068 A1 May 3, 2018

(51) Int. Cl.
*H04L 29/06* (2006.01)
*H04L 29/08* (2006.01)

(52) U.S. Cl.
CPC ............ *H04L 63/108* (2013.01); *H04L 63/08* (2013.01); *H04L 63/0807* (2013.01); *H04L 67/02* (2013.01); *H04L 67/32* (2013.01); *H04L 69/22* (2013.01)

(58) Field of Classification Search
CPC ....... H04L 63/08; H04L 63/108; H04L 67/02; H04L 67/32; G06F 21/31; G06F 21/44
USPC .......................................... 726/2–7; 713/168
See application file for complete search history.

(56) References Cited

U.S. PATENT DOCUMENTS

| | | | |
|---|---|---|---|
| 8,307,119 B2 | 11/2012 | Rochelle et al. | |
| 8,516,552 B2* | 8/2013 | Raleigh ............ | G06Q 10/06375 726/2 |
| 8,793,398 B2 | 7/2014 | Macken et al. | |
| 8,832,240 B2 | 9/2014 | Ruhlen et al. | |
| 8,869,253 B2* | 10/2014 | Atkinson ................ | G06F 21/42 713/183 |
| 8,881,227 B2* | 11/2014 | Rajagopal ............... | H04L 63/08 726/1 |
| 9,189,649 B2* | 11/2015 | Austel ..................... | G06F 21/33 |
| 9,195,768 B2 | 11/2015 | Jenkins et al. | |
| 9,467,457 B2* | 10/2016 | Si .......................... | H04L 63/102 |

(Continued)

OTHER PUBLICATIONS

"Drive REST API", Retrieved on: Apr. 18, 2016 Available at: https://developers.google.com/drive/v3/web/about-auth#AboutAuthorization.

(Continued)

*Primary Examiner* — Hosuk Song
(74) *Attorney, Agent, or Firm* — NovoTechIP International PLLC

(57) ABSTRACT

Techniques and technologies for protocols for accessing hosts are described. In at least some embodiments, a system includes a processing component, and a host protocol component. The host protocol component is configured to receive at a host a request from a client device, the request including a Uniform Resource Locator (URL) string locating at least one of a container or an ecosystem stored by the host; determine using at least a portion of the URL string whether the request is at least one of a container-related request or an ecosystem-related request; generate a response at the host including information responsive to the request, the information including the URL string locating the at least one of the container or the ecosystem, and at least one response parameter; and transmit the response from the host to the client device.

20 Claims, 9 Drawing Sheets

(56) References Cited

U.S. PATENT DOCUMENTS

| | | | |
|---|---|---|---|
| 9,787,551 B2 * | 10/2017 | Newton | H04L 41/5041 |
| 2005/0131907 A1 | 6/2005 | Matsuzawa et al. | |
| 2012/0173612 A1 | 7/2012 | Vegesna-Venkata et al. | |
| 2013/0080507 A1 | 3/2013 | Ruhlen et al. | |
| 2013/0080785 A1 | 3/2013 | Ruhlen et al. | |
| 2013/0297680 A1 | 11/2013 | Smith et al. | |

OTHER PUBLICATIONS

"AJAX Browser—Web-based WebDAV Client", Retrieved on: Apr. 18, 2016 Available at: http://www.webdavsystem.com/ajaxfilebrowser.

Hyttsten, Magnus, "Introducing the Google Drive Android API", Published on: Jan. 16, 2014 Available at: https://developers.googleblog.com/2014/01/introducing-google-drive-android-api.html.

"Google Drive REST API Overview", Retrieved on: Apr. 18, 2016 Available at: https://developers.google.com/drive/v3/web/about-sdk#create_and_open_files_directly_from_the_drive_ui.

Brookes, Tim, "How to Access iCloud Drive Files from Any Device", Published on: Apr. 27, 2015 Available at: http://www.makeuseof.com/tag/access-icloud-drive-files-device/.

Georgiev, et al., "Rethinking Security of Web-Based System Applications", In Proceedings of International World Wide Web Conference Committee, May 18, 2015, 11 pages.

"Support for Third-Party Applications on a Thin Client (Windows Embedded CE 6.0)", Published on: May 1, 2010 Available at: https://msdn.microsoft.com/en-us/library/ee480560(v=winembedded.60).aspx.

"WOPI REST API Reference", Retrieved on: Apr. 22, 2016 Available at: https://wopi.readthedocs.org/projects/wopirest/en/latest/index.html.

Koenigsbauer, Kirk, "New cloud storage options for Office mobile and Office Online", Published on: Apr. 22, 2016 Available at: https://blogs.office.com/2016/01/27/new-cloud-storage-options-for-office-mobile-and-office-online/.

"Web Application Open Platform Interface Protocol", Retrieved on: Apr. 22, 2016 Available at: https://msdn.microsoft.com/en-us/library/hh622722(v=office.12).aspx.

* cited by examiner

```
500 ─┐
      ▼
     {
502 ─── "Bootstrap": {                                              ┌─ 503
504 ───   "EcosystemUrl": "http://.../wopi*/ecosystem?access_token=<ecosystem_token>",
506 ───   "UserId": "User ID",
508 ───   "SignInName": "user@contoso.com",
          "UserFriendlyName": "User Name"
        },
510 ─── "RootContainerInfo": {
512 ───   "ContainerPointer" : {
514 ───     "Url" : "http://.../wopi*/containers/<containerId>?access_token=<per_container_token>",
            "Name" : "Container Name"
516 ───   },
518 ───   "ContainerInfo" : {
520 ───     "Name" : "Container Name",
522 ───     "HostUrl" : "http://contoso/324332",
524 ───     "SharingUrl" : "http://contoso/323432/efewos",
            "UserCanCreateChildContainer" : false,
            "UserCanCreateChildFile" : false,
            "UserCanDelete" : false,
            "UserCanRename" : false
          }
        }
     }
```

Fig. 5

| Endpoint | Operation | URL | Override |
|---|---|---|---|
| Ecosystem | CheckEcosystem | GET /wopi*/ecosystem | |
| | GetNewAccessToken | POST /wopi*/ecosystem | GET_NEW_ACCESS_TOKEN |
| | GetFileWopiSrc | POST /wopi*/ecosystem | GET_WOPI_SRC_WITH_ACCESS_TOKEN |
| | GetRootContainer | GET /wopi*/ecosystem/root_container_pointer | |

Fig. 6

```
700 ─┐
     ▼
{
   "Bootstrap": {
      "EcosystemUrl":
"http://.../wopi*/ecosystem?access_token=<ecosystem_token>",
      "UserId": "User ID",
      "SignInName": "user@contoso.com",
      "UserFriendlyName": "User Name"
   },
702 ──"AccessTokenInfo": {
704 ─────"AccessToken": "1234567890abcdef",
         "AccessTokenExpiry": 1234567890
   }
}
```

Fig. 7

```
800 ─┐
     ▼
                                    ┌── 802
{
   "Url":
"http://.../wopi*/[containers|files]/<id>?access_token=<file
|container_token>&access_token_ttl=<timestamp>"
}                                   ◀── 804
```

| Endpoint | Operation | URL | Override |
|---|---|---|---|
| Containers | CheckContainerInfo | GET /wopi*/containers/<containerId> | |
| | RenameContainer | POST /wopi*/containers/<containerId> | RENAME_CONTAINER |
| | DeleteContainer | POST /wopi*/containers/<containerId> | DELETE_CONTAINER |
| | CreateChildContainer | POST /wopi*/containers/<containerId> | CREATE_CHILD_CONTAINER |
| | CreateChildFile | POST /wopi*/containers/<containerId> | CREATE_CHILD_FILE |
| | EnumerateChildren | GET /wopi*/containers/<containerId>/children | |
| | EnumerateAncestors | GET /wopi*/containers/<containerId>/ancestry | |
| | GetEcosystem | GET /wopi*/containers/<containerId>/ecosystem_pointer | |

```
1010 → {
1012 →     "ChildContainers": [
           {
1013 →         "Url":
           "http://.../wopi*/containers/<containerId>?access_token=<per
           _file_token>",
               "Name": "FolderName"
1014 →     },
1016 →     {
1017 →         "Url":
           "http://.../wopi*/containers/<containerId2>?access_token=<pe
           r_file_token2>",
               "Name": "FolderName2"
1018 →     }
1020 →     ],
           "ChildFiles": [
1022 →     {
1023 →         "Url":
           "http://.../wopi*/files/<fileId>?access_token=<per_file_toke
           n>",
1024 →         "Name": "FileName",
1026 →         "Version": "version1",
1028 →         "Size": 7,
1030 →         "LastModifiedTime": "time last modified"
           }
           ]
       }
```

Fig. 10

```
1100
  1110
      "AncestorsWithRootFirst": [
1112      {
              "Url":                                              1113
              "http://.../wopi*/containers/<containerId>?access_token=<per
              _container_token>",
              "Name": "root"
1114      },
1116      {
              "Url":                                              1117
              "http://.../wopi*/containers/<containerId2>?access_token=<pe
              r_container_token2>",
              "Name": "grandparent"
1118      },
1120      {
              "Url":                                              1121
              "http://.../wopi*/containers/<containerId3>?access_token=<pe
              r_container_token3>",
              "Name": "parent"
1122      }
      ]
  }
```

| Endpoint | Operation | URL | Override |
|---|---|---|---|
| Files | GetEcosystem | GET /wopi*/files/<fileId>/ecosystem_pointer | |
| | GetLock | GET /wopi*/files/<fileId> | GET_LOCK |
| | EnumerateAncestors | GET /wopi*/files/<fileId>/ancestry | |

Fig. 12

```
1300 ─┐
  ┌ 1310 ─┐
  {
      "AncestorsWithRootFirst": [
1312 ─┤ {                                                        ┌─ 1313
        "Url":
        "http://.../wopi*/containers/<containerId>?access_token=<per
        _container_token>",
1314 ─┐ "Name": "root"
      },
1316 ─┤ {                                                        ┌─ 1317
        "Url":
        "http://.../wopi*/containers/<containerId2>?access_token=<pe
        r_container_token2>",
         "Name": "grandparent"
1318 ─┤ },
1320 ─┤ {                                                        ┌─ 1321
        "Url":
        "http://.../wopi*/containers/<containerId3>?access_token=<pe
        r_container_token3>",
1322 ─┤ "Name": "parent"
      }
    ]
  }
```

Fig. 13

PROTOCOLS FOR ACCESSING HOSTS

BACKGROUND

There is currently a trend toward enabling remote access to a wide variety of computer files and services available on a variety of hosts (e.g. servers) from one or more client devices via a network. For example, cloud-based computing systems may enable a user's files to be stored in a remote storage facility, and those files may then be remotely accessible on a limited basis via the Internet by the user using a suitable client device. Known protocols for performing such limited-access activities include those protocols disclosed, for example, by U.S. Pat. No. 8,832,240 entitled "Interfacing Distinct Services for Providing Web Based Document Manipulation Access," U.S. Pat. No. 9,319,469 entitled "Host Agnostic Integration and Interoperation System," and U.S. Patent Publication No. 2013/0080507 entitled "External Service Application Discovery Method." Although highly desirable results have been achieved using such conventional protocols, there is room for improvement.

SUMMARY

In at least some embodiments, a system includes a processing component operatively coupled to a memory; and a host protocol component stored on the memory, the host protocol component including one or more instructions that when executed by the processing component perform one or more operations including: receiving at the host a request from the client device, the request including a Uniform Resource Locator (URL) string locating at least one of a container or an ecosystem stored by the host; determining using at least a portion of the URL string whether the request is at least one of a container-related request or an ecosystem-related request; generating a response at the host including information responsive to the request, the information including the URL string locating the at least one of the container or the ecosystem, and at least one response parameter corresponding to the request and associated with the at least one of the container or the ecosystem; and transmitting the response from the host to the client device.

Alternately, in at least some embodiments, a system includes a processing component operatively coupled to a memory; and a host protocol component stored on the memory, the host protocol component including one or more instructions that when executed by the processing component perform one or more operations including: receiving an authentication request from a client device requesting to be authenticated with a host, the authentication request including authentication information; performing an initial authentication using a standard authentication scheme of the host at least partially based on the authentication information; providing at least one standard access information to the client device based on the standard authentication scheme; receiving a protocol-related authentication request from the client device, the protocol-related authentication request including the at least one standard access information; providing protocol-related information and at least one protocol-related access token to the client device based at least partially on the protocol-related authentication request including the at least one standard access information; receiving at the host a request from the client device, the request including a Uniform Resource Locator (URL) string locating at least one of a container or an ecosystem stored by the host and the protocol-related access token; determining using at least a portion of the URL string whether the request is at least one of a container-related request or an ecosystem-related request; determining whether the request is authorized to be performed based at least partially on the protocol-related access token; and if the request is authorized: generating a response at the host including information responsive to the request, the information including the URL string locating the at least one of the container or the ecosystem, and at least one response parameter corresponding to the request and associated with the at least one of the container or the ecosystem; and transmitting the response from the host to the client device.

In addition, in at least some embodiments, a method for communicating between a client device and a host includes authenticating the client device with the host, including providing at least one protocol-related access token to the client device; receiving at the host a request from the client device, the request including a Uniform Resource Locator (URL) string that includes a root-level information that locates at least one of a container or an ecosystem stored by the host and enables at least one of a browsing or a navigating command related to the at least one of the container or the ecosystem, and the at least one protocol-related access token; determining using at least a portion of the URL string whether the request is at least one of a container-related request or an ecosystem-related request; determining that the request from the client device is authorized based at least partially on the at least one protocol-related access token; if the request is authorized: generating a response at the host including information responsive to the request, the information including the URL string locating the at least one of the container or the ecosystem, and at least one response parameter corresponding to the request and associated with the at least one of the container or the ecosystem; and transmitting the response from the host to the client device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the use of the same reference numbers in different figures indicates similar or identical components.

FIG. 5 shows an embodiment of a response by a host to a bootstrapper request by a client device.

FIG. 6 shows a table of possible operations that may be involved when the request received at the host is an ecosystem-related request.

FIG. 7 shows an embodiment of a response by a host to a request for a new access token.

FIG. 8 shows an embodiment of a response by a host to a request for a protocol source.

FIG. 9 shows a table of possible operations that may be involved when the request received at the host is a container-related request.

FIG. 10 shows an embodiment of a response by a host to a request to enumerate children of a container.

FIG. 11 shows an embodiment of a response by a host to a request to enumerate ancestors of a container.

FIG. 12 shows a table of possible operations that may be involved when the request received at the host is a file-related request.

FIG. 13 shows an embodiment of a response by a host to a request to enumerate ancestry of a file.

DETAILED DESCRIPTION

The present disclosure describes techniques and technologies for protocols for accessing hosts. As described more fully below, techniques and technologies for protocols for accessing hosts as disclosed herein may considerably improve accessibility and functionality of user devices remotely accessing files and other data structures on remote systems, and may do so in a manner that improves the efficiency and operability of networked systems in comparison with conventional networked systems.

For example, in at least some implementations, users that use applications operating on a user's client device, both native applications as well as web-based applications, often desire to browse for files stored on a remote host (e.g. server), open those files, and save the changes back to the host. Applications wherein such functionality may be desirable include Microsoft Office® for iOS, Android, and Office® desktop. Implementations of protocols for accessing hosts in accordance with the present disclosure enable a host to become "browseable" by any client device that knows how to communicate via the protocol. Thus, a protocol-enabled client device can browse a "container" structure that exists on the host, open files from that host, and save changes directly back to the host. In addition, in at least some implementations, a protocol in accordance with the present disclosure may also provide a way for applications to use existing authentication/authorization mechanisms to initially retrieve access tokens (or other access information) that can then be converted to protocol-specific access tokens that are used by the client device to access files on the host, thereby providing improved flexibility for both native applications and web-based applications to perform the desired browsing and file accessing operations on the host. In this way, techniques and technologies in accordance with the present disclosure may provide substantial improvements in the operations of one or more computers operated by one or more users of an environment in comparison with conventional technologies, as described more fully below.

Environment for Implementing Protocols for Accessing Hosts

Figure 1:
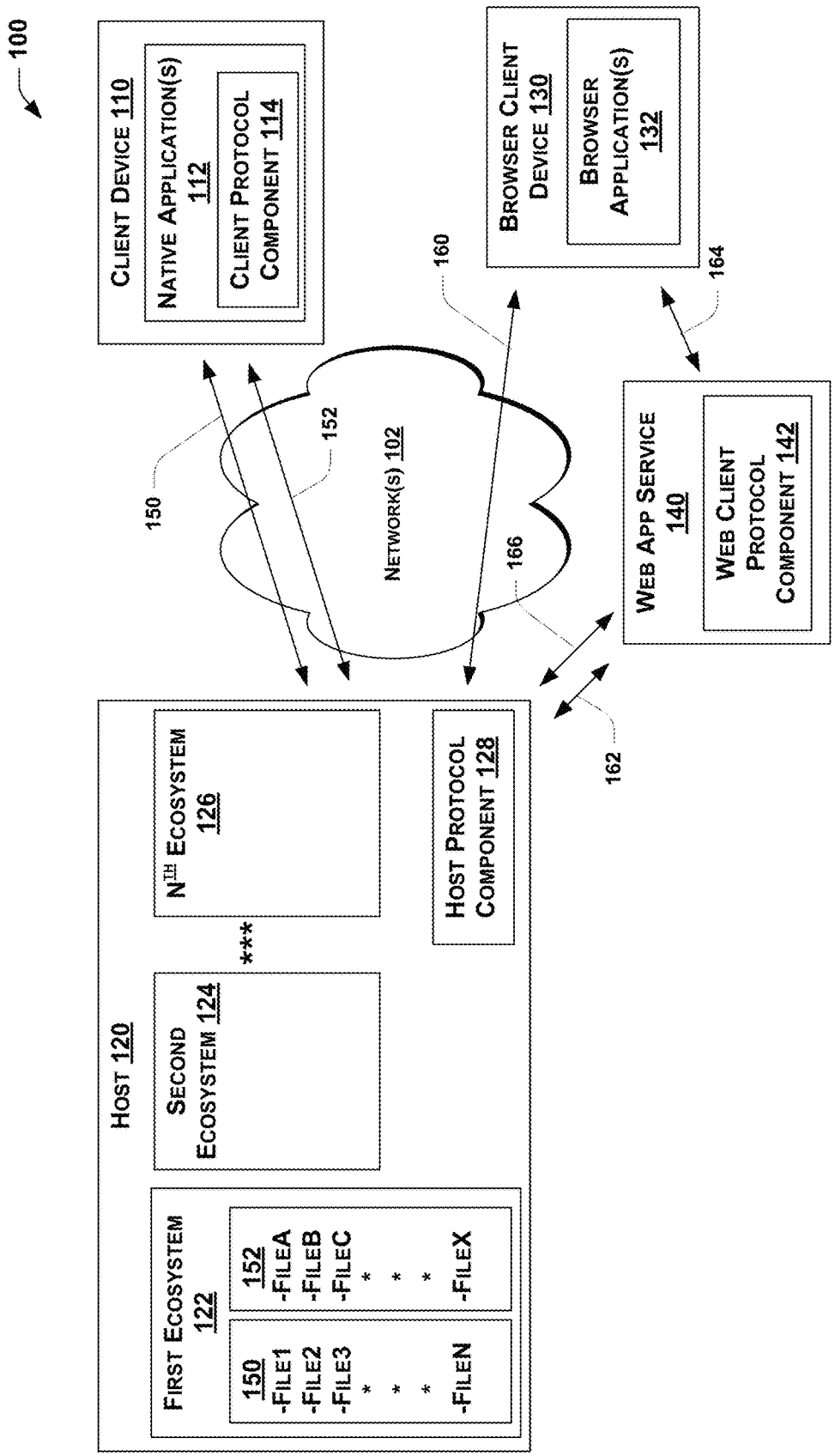
FIG. 1 shows an embodiment of an environment for implementing protocols for accessing hosts.

FIG. 1 shows an embodiment of an environment 100 for protocols for accessing hosts in accordance with the present disclosure. In this embodiment, the environment 100 includes a client device 110 that accesses a host (or server) 120 via one or more networks 102. The client device 110 includes one or more native applications 112 (e.g. stored in a memory of the client device 110) and a client protocol component 114. In at least some implementations, the client protocol component 114 may be part of the one or more native applications 112 (as shown in FIG. 1), however, in alternate implementations, the client protocol component 114 may be a separate, standalone component, or may be part of an underlying communication system (e.g. a Basic Input Output System (BIOS)).

In this embodiment, the host 120 includes a plurality of ecosystems (e.g. first ecosystem 122, second ecosystem 124, $N^{th}$ ecosystem 126) and a host protocol component 128. It will be appreciated that the host protocol component 128 and the client protocol component 114 are configured to implement one or more protocols in accordance with the present disclosure to perform one or more operations as described herein.

As used herein, the term "container" may be understood to refer to an organization of digital objects (e.g. other containers, folders, files, programs, data structures, other software objects, etc.) associated by a common organizing characteristic (e.g. user, group, company, etc.), and that may or may not be limited to a single system or device, but may span across multiple systems or devices. In addition, as used herein, the term "ecosystem" may be understood to refer to a highest level container (or root container) within which all of the digital objects associated by a common organizing characteristic exist.

In the embodiment shown in FIG. 1, the first ecosystem 122 of the host 120 includes a first container 150 having a first plurality of files (File1 through FileN) stored therein, and a second container 152 having a second plurality of files (FileA through FileX) stored therein. It will be appreciated that the depiction of the host 120 show in FIG. 1 has been greatly simplified for ease of understanding, and that the first ecosystem 122 may contain additional containers, and that such additional containers may also contain one or more additional files. Similarly, the other ecosystems 124, 126 of the host 120 may also contain additional containers (not shown), and that such additional containers of the other ecosystems 124, 126 may also contain one or more additional files (not shown) that the client device 110 may desire to access. In addition, it will be appreciated that in alternate implementations, the environment 100 may include additional hosts that may be accessed by the client device 110 (or the browser client device 130), or may also include additional client devices that may access the host 120.

In at least some implementations, the client protocol component 114 and the host protocol component 128 may be application programming interfaces (APIs) configured to communication in accordance with one or more protocols in accordance with the present disclosure. More specifically, in at least some implementations, the client protocol component 114 and the host protocol component 128 may be Representational State Transfer (REST)-based APIs. In at least some implementations, the fundamental communication mechanism utilized by the open platform interface is a basic request-response protocol, such as hypertext transport protocol (HTTP) or hypertext transport protocol secure (HTTPS). More specifically, in at least some implementations, a transaction may be generally implemented as a standard HTTP request against a Uniform Resource Locator (URL) with a host-generated access token appended for authentication.

Calling information in requests from the client protocol component 114 (or the web client component 142) to the host protocol component 128 may be contained in the URL, a header, and as necessary, a body of the request. In response, the host protocol component 128 may provide information about files, ecosystems, or other data structures stored on the host 120, as well as the binary contents of those files. In at least some implementations, the host protocol component 128 provides this information via specific URLs.

By implementing a protocol for accessing hosts in accordance with the present disclosure, the host protocol component 128 and the client protocol component 114 operatively communicate to enable a user of the client device 110 to use the one or more native applications 112 to browse the ecosystems 122, 124, 126 of the host 120, and to perform other desired actions on the content of the ecosystems 122, 124, 126, including accessing, viewing, editing and saving files or documents.

In at least some implementations, the one or more native applications 112 on the client device 110 may include one or more of an electronic messaging application (e.g. email, instant messages, etc.), an electronic calendaring application, or any other suitable applications, such as the Microsoft Outlook® product, or the Microsoft Office365® suite of applications. In at least some implementations, the one or more native applications 112 may include an application that enables a user to accomplish other tasks and responsibilities, such as one or more communication applications (e.g. IBM Lotus Sametime®, Microsoft Lync®, Unison®, etc.), document management system (e.g. IBM Lotus Quickr®, Microsoft Sharepoint®, Microsoft Dropbox®, etc.), a word-processing application (e.g. Microsoft Wore®), an application for creating drawings (e.g. Microsoft Visio®), a spreadsheet application (Microsoft Excel®), a presentation application (e.g. Microsoft PowerPoint®), a computer-aided design (CAD) application, or any other suitable productivity applications.

As further shown in FIG. 1, the environment 100 further includes a browser client device 130 that includes one or more browser applications 132 that enable a user to browse and view webpages (e.g. Microsoft Internet Explorer®, Google Chrome®, Mozilla Firefox®, etc.), and a web app service 140 that includes a web client protocol component 142. The web client protocol component 142 is configured to communicate with the host protocol component 128 to implement one or more protocols for accessing hosts in accordance with the present disclosure. Thus, in at least some implementations, the web applications service 140 may enable the browser client device 130 to provide any and all of the same functionalities afforded by the native applications 112 by means of the one or more browser applications 132 accessing the web application service 140. More specifically, by implementing a protocol for accessing hosts in accordance with the present disclosure, the host protocol component 128 and the web client protocol component 142 operatively communicate to enable a user of the browser client device 130 to use the one or more browser applications 132 to browse the ecosystems 122, 124, 126 of the host 120, and to perform other desired actions on the content of the ecosystems 122, 124, 126, including accessing, viewing, editing and saving files or documents.

In operation, in at least some implementations, the client device 110 may perform an initiation operation 150 with the host 120 wherein the client device 110 becomes authenticated to, and authorized to communicate with, the host 120. Following the initiation operation 150, the client device 110 may conduct one or more additional operations 152 with the host 120 using the one or more native applications 112 in accordance with one or more protocols for accessing hosts, including, for example, browsing the one or more of the ecosystems 122, 124, 126 contained on the host 120, accessing and viewing containers or files existing within the ecosystems 122, 124, 126, viewing, editing, and storing files, or various other operations, as described more fully below.

Similarly, in at least some implementations, the browser client device 130 may perform another initiation operation 160 with the host 120 wherein the browser client device 130 becomes authenticated to, and authorized to communicate with, the host 120, which in turn performs a subsequent initiation operation with the web application service 140. Following these initiation operations 160, 162, the browser client device 130 may conduct one or more browser-based operations 164 with the web application service 140 using the one or more browser applications 132. In turn, the one or more browser-based operations 164 may result in one or more additional operations 166 between the web application service 140 and the host 120 in accordance with one or more protocols for accessing hosts, including, for example, browsing the one or more of the ecosystems 122, 124, 126 contained on the host 120, accessing and viewing containers or files existing within the ecosystems 122, 124, 126, viewing, editing, and storing files, or various other operations, as described more fully below.

Protocols for Accessing Hosts

In at least some implementations, a protocol for accessing a host in accordance with the present disclosure may include a set of operations that enables a client to browse ecosystems on the host, and perform a variety of other operations on the contents of such ecosystems, including accessing, viewing, editing and storing files stored by the host. More specifically, in at least some implementations, a protocol for accessing a host in accordance with the present disclosure may define a set of Representational State Transfer (REST) endpoints that expose information needed by the client device to perform operations within one or more ecosystems on the host (e.g., endpoints for files that a client device wants to view or access using an application, endpoints for file contents that the client device wants to perform operations on, endpoints for one or more containers that a client wishes to browse, endpoints for one or more ecosystems, that a client wishes to browse, etc.), as well as operations that can be executed by issuing Hypertext Transfer Protocol (HTTP) requests to those endpoints.

In the following discussion, the term "File ID" is used to refer to a string that represents a file being operated on via one or more protocol operations. In at least some implementations, a host issues a unique File ID for any file used by a client (or client application), and subsequently, the client includes the File ID when making one or more requests back to the host. In at least some implementations, the File ID represents a single file, and is a URL-safe (Uniform Resource Locator) string, and remains the same when the file is edited, moved, renamed, or other operations are performed. In at least some implementations, the File ID may remain the same when any ancestor container, including the parent container, is renamed, and for cases of shared filed, may be the same for every user that accesses the file.

In addition, as used in the following discussion, the term "access token" is used to refer to a string that that is used by a host to determine the identify and permissions of a client (or client application) to perform one or more operations of a protocol for accessing hosts as disclosed herein. In at least some implementations, the host provides an access token to the client, and the client then passes the access token back to the host on subsequent protocol operations. When the host receives the access token back from the client, the host may validate the client, or the host may respond with an appropriate status code if the access token is invalid or unauthorized. In at least some implementations, the client requires no understanding of the format or content of the access token, and the client may simply include the access token in subsequent protocol operations and expects the host to validate the client and/or the operation. In at least some implementations, the access token is scoped to a single user and resource combination, and a client may not employ the same access token for a different user or a different resource. For example, in at least some implementations, a protocol for accessing a host in accordance with the present disclosure relies on requests from the client device and responses from the host that are formulated in a defined HTTP (or HTTPS) format. In addition, in at least some implementations, some other authorization information may be employed rather than tokens (e.g. cookies, data, etc.).

In at least some implementations, the communication format for requests made by a client device to a host includes a request header and a request body. Similarly, the responses from the host to the client device may include a response header and a response body. The request header may have the following string value "Bearer <token>", where "Bearer" identifies the user and "token" is the access token for the request. Similarly, in at least some implementations, the communication format of the body of the request may be based on a REST-based protocol.

In at least some implementations, a "protocol name" field is a term or acronym that refers to the particular protocol for accessing hosts that is being used, such as, for example, the Web Application Open Platform Interface Protocol (or "WOPI") developed by Microsoft®. Previous versions of the WOPI protocol (that do not include additional aspects and capabilities described herein) have been previously documented and disclosed, for example, in U.S. Pat. No. 8,832,240 issued to Matthew J. Ruhlen et al. entitled "Interfacing Distinct Services for Providing Web Based Document Manipulation Access," U.S. Pat. No. 9,319,469 issued to Matthew J. Ruhlen et al. entitled "Host Agnostic Integration and Interoperation System," and U.S. Patent Pub. No. 2013/0080507 by Matthew J. Ruhlen et al. entitled "External Service Application Discovery Method," which patents and pending applications are hereby incorporated by reference. Additional aspects and capabilities of protocols for accessing hosts in accordance with the present disclosure are described more fully below. It will be appreciated that the term "WOPI" may be used in the following discussion to refer to a protocol for accessing hosts in accordance with the present disclosure, and that even though the term "WOPI" has been previously used to refer to prior versions of such protocols, such prior versions had fewer and more limited capabilities than the protocols for accessing hosts disclosed herein. Therefore, the use of the term "WOPI" herein is not to be construed as being limited to such prior, more limited protocol versions, and instead, should be understood to refer to one or more protocols that may have one or more additional aspects and capabilities disclosed herein, and may also have one or more of the previously disclosed aspects and capabilities described in previous disclosures.

For example, in at least some implementations, an additional aspect or capability provided by a protocol in accordance with the present disclosure is that hosts are made "browseable" by any client device that knows how to communicate via the protocol. Whereas previous protocols implemented commands related to specific objects (e.g. files), protocols in accordance with the present disclosure enable and implement commands related to collections of objects (e.g. containers, ecosystems). In other words, previous protocols employed a "tree-down" implementation that only allowed commands directed to specific objects, with no "root-level" visibility available. Alternately, protocols in accordance with the present disclosure enable root-level information to enable a client device to navigate a collection of objects associated with a specified user, from a root-level down. Thus, protocols in accordance with the present disclosure enable commands related to "containers" and "ecosystems" which connote a hierarchy of objects and not just a single object or entity.

Figure 2:
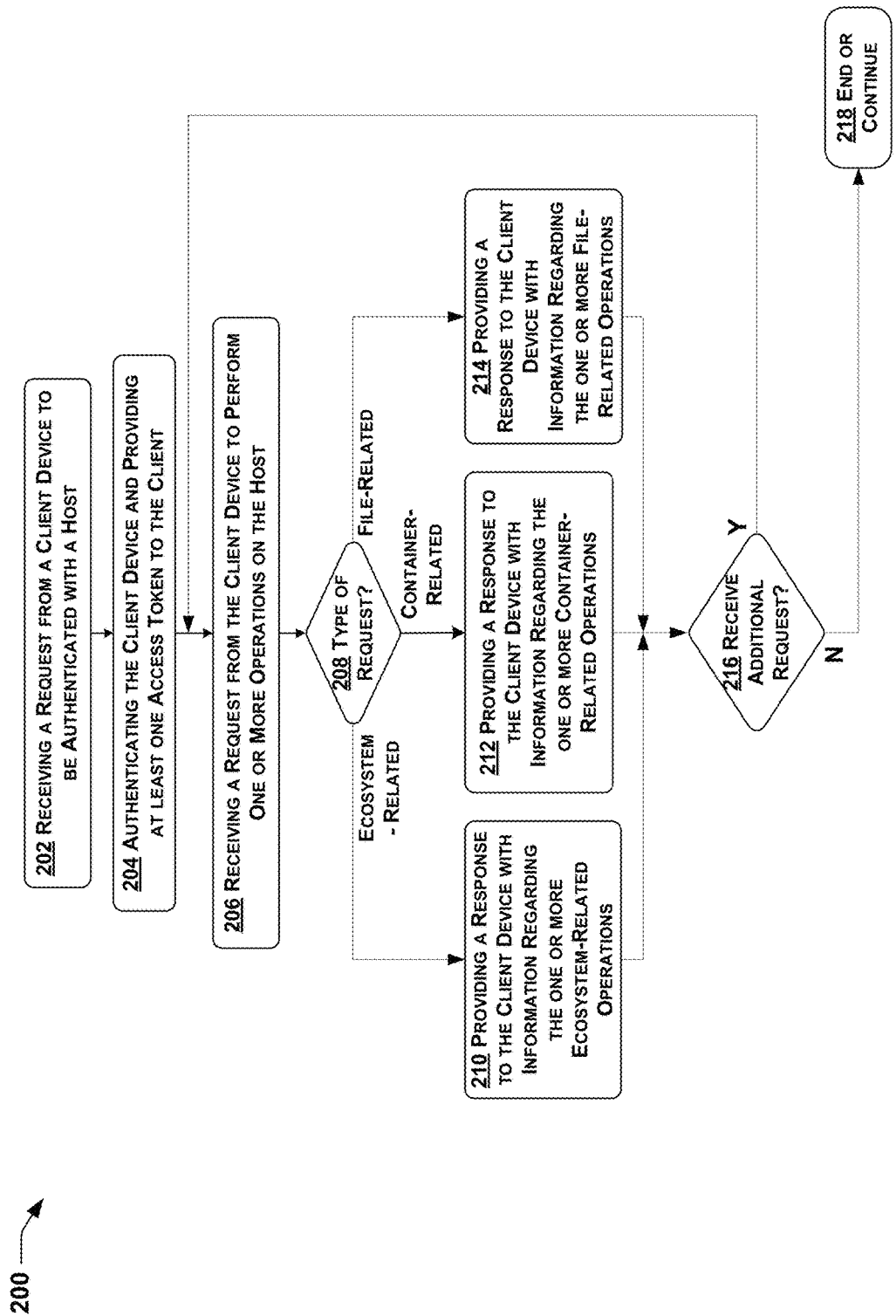
FIG. 2 shows an embodiment of a process for accessing a host using a protocol for accessing hosts.

FIG. 2 shows an embodiment of a process 200 for accessing a host using a protocol for accessing hosts in accordance with the present disclosure. In this embodiment, the process 200 is described from the perspective of the host (e.g. host 120) that is being accessed by a client device (e.g. client device 110). In the following discussion, the process 200 will initially be described relatively briefly with reference to FIGS. 1 and 2, and then one or more of the operations of the process 200 will be described in greater detail with reference to subsequent figures.

As shown in FIG. 2, in this embodiment, the process 200 includes receiving a request from a client device to be authenticated with a host at 202. For example, the host 120 of FIG. 1 may receive a request from the client device 120 to be authenticated for accessing the host 120 (at 202). Next, the process 200 includes authenticating the client device and providing at least one access token to the client device at 204. Various aspects and implementations of the authenticating (at 204) will be described in greater detail below with reference to FIGS. 3 and 4.

The process 200 further includes receiving a request from the client device to perform one or more operations on the host at 206. For example, the host 120 may receive (at 206) a request from the client device 110 to perform one or more operations involving one or more ecosystems (e.g. ecosystems 120, 122, 124) on the host 120, or to perform one or more operations involving one or more containers (e.g. containers 152, 154 within the first ecosystem 120) on the host 120. Alternately, the host 120 may receive (at 206) a request from the client device 110 to perform one or more operations involving one or more of the files (e.g. File1, File2, FileN, etc. within the first container 150 of the first ecosystem 120 on the host 120).

At 208, the process 200 includes determining a type of request received by the host (at 206). If it is determined (at 208) that the request includes one or more ecosystem-related operations, then the process 200 proceeds to providing a response to the client device with information regarding the one or more ecosystem-related operations at 210. Various aspects and implementations of the one or more ecosystem-related operations that may be requested (at 206) and responded to (at 210) will be described in greater detail below with reference to FIGS. 6 through 8.

Alternately, if it is determined (at 208) that the request includes one or more ecosystem-related operations, then the process 200 proceeds to providing a response to the client device with information regarding the one or more container-related operations at 212. Various aspects and implementations of the one or more container-related operations that may be requested (at 206) and responded to (at 212) will be described in greater detail below with reference to FIGS. 9 through 11.

As further shown in FIG. 2, if it is determined (at 208) that the request includes one or more file-related operations, then the process 200 proceeds to providing a response to the client device with information regarding the one or more file-related operations at 214. Various aspects and implementations of the one or more file-related operations that may be requested (at 206) and responded to (at 214) will be described in greater detail below with reference to FIGS. 12 through 13.

As further shown in FIG. 2, the process 200 further includes determining whether an additional request is being received at 216. If not, the process 200 ends or continues to other operations at 218. If it is determined, however, that an additional request is being received (at 216), then the process 200 returns to receiving the request from the client device (at 206), and one or more of the above-described operations 206-216 are repeated indefinitely until no additional requests are received. Once it is determined (at 216) that no additional requests are being received, then the process 200 ends or continues to other operations at 218.

Figures 3, 4:
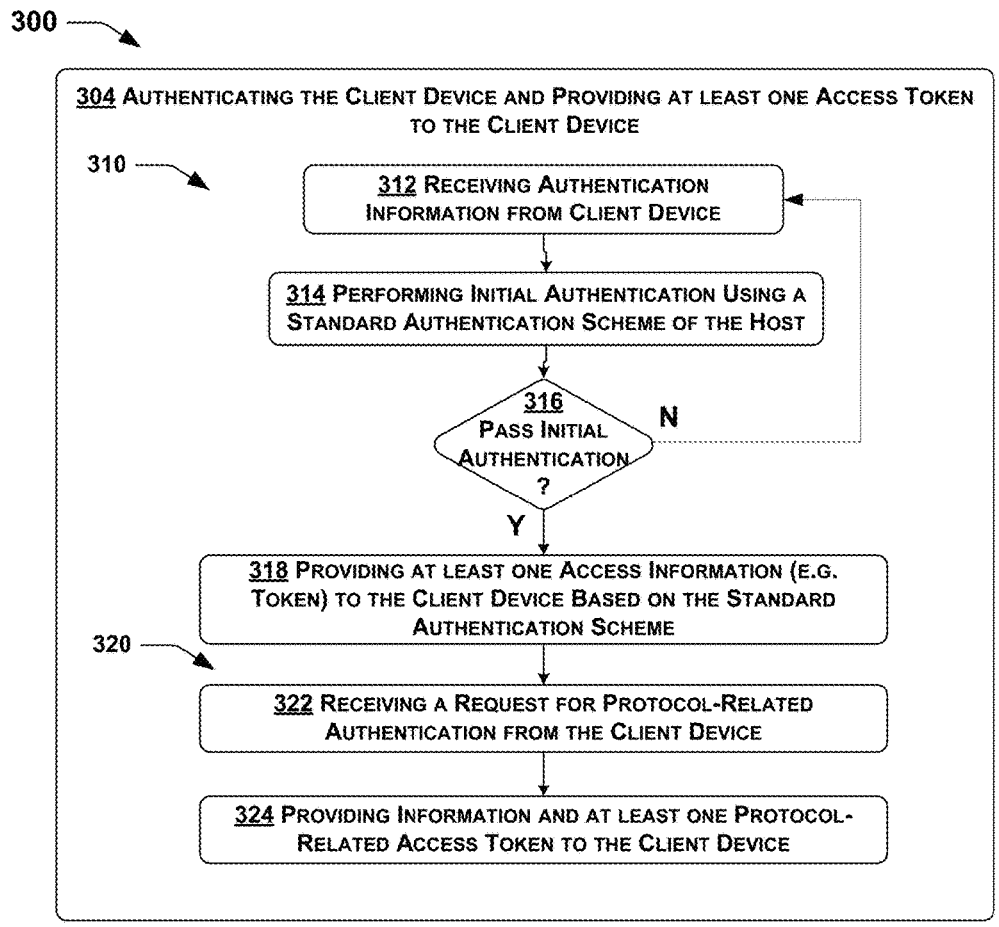
FIG. 3 shows an embodiment of a process for authenticating a client device to a host.
FIG. 4 shows a table of possible operations that may be involved in a bootstrapper authentication process.

One or more aspects and implementation details of the operations of the representative process 200 shown in FIG. 2 will now be described in greater detail. More specifically, FIG. 3 shows an embodiment of a process 300 for authenticating a client device to a host. The process 300 shown in FIG. 3 may be used during the authenticating of the client device (at 204) of the process 200 of FIG. 2. In the embodiment shown in FIG. 3, the process 300 has already received an authentication request from a client device to be authenticated with a host (e.g. at 202). For example, in at least some implementations, the client device 110 may have the ability to contact the host 120 to request authentication (at 202), such as by one or more of the native applications 112 (e.g. one or more applications of Microsoft Office®) stored on the client device 110 providing the desired capability to initiate communications with the host 120 to request authentication before accessing one or more of the ecosystems 122, 124, 126 contained on the host 120. Of course, in other implementations, the host may receive a request (at 202) from the client device 110 to be authenticated with the host 120 in any other suitable way.

As shown in FIG. 3, the process 300 includes authenticating the client device and providing a response including at least one access token for the client device to access the host at 304. In at least some implementations, the authenticating (at 304) may include a first part 310 that involves the client device being authenticated to the host using a standard authentication scheme of the host (e.g. an authorization scheme that is generally known, an industry standard, already in use by the host, etc.), and a second part 320, which may be referred to as a "bootstrapper," wherein the client and the host exchange additional information needed for facilitating protocol communications using one or more protocols in accordance with the present disclosure.

For example, as shown in FIG. 3, the first part of the authenticating (at 310) may include receiving authentication information from the client device at 312, and performing an initial authentication using a standard authentication scheme of the host at 314. More specifically, in at least some implementations, the host 120 may use an industry standard authentication scheme, such as OAuth (Open Authentication), or alternately, the host 120 may have a custom authentication scheme (e.g. such as those used by Microsoft Sharepoint®, Microsoft OneDrive®, Exchange, etc.). For example, the standard authentication scheme of the host (at 314) may enable the client device to contact a known URL for sending requests and authentication information in order to perform authentication to the host 120. In at least some implementations, the authenticating (at 314) may include the host receiving authentication information from the client device (e.g. username, password, device ID, biometric information, etc.), analyzing the authentication information provided by the client device, and determining whether the authentication information is acceptable for authentication of the client device (e.g. checking username and password, checking device ID, checking privilege, checking account settings, etc.). A variety of conventional techniques are known and suitable for performing the initial authentication of the client device (at 314).

The process 300 further includes determining whether the client device has passed the initial authentication at 316. If not, the process 300 returns to receiving authentication information from the client device (at 312) and the process 300 repeats the above-described operations 312 through 314 until the client device has passed the initial authentication at 316. In some alternate implementations, however, the process 300 may proceed to the second part 320 of the process 300 even if the client device has not passed the initial authentication at 316. In at least some implementations, the determination at 316 may include determining whether the number of failed authentication attempts has exceeded a maximum allowable number, and if so, the process 300 may end without successful authentication.

Once the client device has passed the initial authentication (at 316), the process 300 proceeds to the second or "bootstrapper" part 320 of the authentication process. In the bootstrapper part 320 of the authentication process, the host and the client device may perform one or more bootstrapper operations that enable the client device and to perform the desired accessing of the host using a protocol in accordance with the present disclosure. FIG. 4 shows a table 400 of possible operations that may be involved in the bootstrapper part 320 of the authentication process 300. More specifically, in at least some implementations, the bootstrapper part 320 of the authentication process 300 may provide access to one or more protocol operations in accordance with the present disclosure, and may convert an access token (or other access information) provided by the host's standard authentication scheme (at 318) (e.g. an OAuth token or other token or other access information resulting from a customized authentication scheme) into one or more appropriate access tokens for use with the protocol for accessing hosts in accordance with the present disclosure.

With reference to FIG. 3, in at least some implementations, the process 300 further includes receiving a request for protocol-related authentication from the client device at 322. More specifically, in at least some implementations, receiving a request for protocol-related authentication from the client device (at 322) may include the client device 110 sending the "GET/wopibootstrapper" request to the host 120 (see FIG. 4). In at least some other implementations, the receiving a request (at 322) may result automatically from the client device successfully passing the first part 310 of the authentication process 300, and no additional action or information from the client device 110 may be needed.

In at least some implementations, the client device 110 (e.g. the client protocol component 114) provides authentication state information from the first part 310 of the authentication process 300 (e.g. from the OAuth protocol, or a custom authentication protocol, etc.) in the HTTP header in every request to the bootstrapper endpoint, including the request for protocol-related authentication (received at 322). This authentication state information may, for example, be sent in the form of the at least one access information (e.g. token) from the standard authentication scheme (e.g. OAuth token) (provided at 318).

As further shown in FIG. 3, the bootstrapper part 320 of the authentication process 300 further includes providing information and at least one protocol-related access token to the client device at 324. For example, in at least some implementations, the providing (at 324) may include the host 120 performing a "POST/wopibootstrapper" operation (see FIG. 4). As shown in FIG. 4, the "POST/wopibootstrapper" operation may result in one or more additional operations (or "overrides"), including at least one of "GET_NEW_ACCESS_TOKEN," "GET_WOPI_SRC_WITH_ACCESS_TO-KEN," or "GET_ROOT_CONTAINER". It will be appreciated that the "override" column shown in FIG. 4 refers to the values of an HTTP header on POST requests, wherein the overriding of the default POST operation semantic with a known header is a REST-based technique.

More specifically, the "GET_NEW_ACCESS_TOKEN" operation may be used by the host to retrieve a fresh protocol access token for a given resource (i.e. an ecosystem, a container, a file, etc.) provided that the client device 110 has successfully passed the host's standard authentication scheme (first part 310) and already has a valid token from that authentication scheme (provided at 318). In at least some implementations, the "GET_NEW_ACCESS_TO-KEN" operation may also be called by client devices that have suitable protocol-related capabilities, such as OAuth-capable protocol-enabled client devices (e.g. Office for iOS), or other standard-authentication-capable protocol-enabled client devices, to refresh protocol-related access tokens after they expire (or relatively near expiration). In this way, implementations in accordance with the present disclosure allow for relatively easy re-issuance of protocol-specific access tokens, providing computational efficiency (and corresponding power savings) over conventional protocols that require relatively computationally intensive re-execution of authentication processes after expiration of an access token.

FIG. 5 shows an embodiment of a response 500 by a host to a bootstrapper request by a client device. In at least some implementations, the "GET_WOPI_SRC_WITH_ACC-ESS_TOKEN" operation may be used by the host to provide a response to the client device that includes: (a) an "EcosystemUrl" 502 which may include a string Url for the protocol host's ecosystem endpoint, and a protocol-specific access token 503 appended, (b) a "UserId" 504 which may include a string value uniquely identifying the user making the request, and which may be unique to the user and consistent over time, and (c) a "SignInName" 506 which may include a string value identifying the user making the request (e.g. an email address, etc.) in the event that the user has multiple accounts with the host. Optionally, the "GET_WOPI_SRC_WITH_ACCESS_TOKEN" operation may also be used by the host to provide a response to the client device that includes a "UserFriendlyName" 508 which may include a string that is the actual name (or nickname) of the user.

Similarly, in at least some implementations, the "GET_ROOT_CONTAINER" operation may be used by the host to provide to the client device the root container information needed by the client device. The information provided by the host may include, for example, a "ContainerPointer" 510 including a URL to the root container 512 and a name of the root container 514. The response provided by the host may also include a "ContainerInfo" 516 that may include, for example, the container name 518, a host URL 520 associated with the container, a sharing URL 522 associated with the container, and one or more privilege parameters 524 that indicate the privileges or capabilities granted to the requesting client device for performing one or more operations involving the root container 514.

Referring again to FIG. 2, the process 200 for accessing a host using a protocol in accordance with the present disclosure includes the host receiving a request from the client device to perform one or more operations on the host (at 206), and determining the type of the request received by the host (at 208). In at least some implementations, the host determines that the request is an ecosystem-related request by determining that the request includes an "ecosystem" endpoint.

FIG. 6 shows a table of possible operations 600 that may be involved when the request received at the host (at 206) is an ecosystem-related request. It will be appreciated that one or more of the operations shown in FIG. 6 may be used to facilitate browsing of one or more ecosystems (or other ecosystem-related operations) stored by the host using the client device. For example, in at least some implementations, the request received by the host from the client device may include a "CheckEcosystem" request that may have the following form: "GET/wopi/ecosystem". In at least some implementations, the "CheckEcosystem" request is accompanied by an access token (e.g. protocol-related access token provided at 324) that the host will use to determine whether the request is authorized. In at least some implementations, the "CheckEcosystem" is used to obtain metadata for the ecosystem itself, and can be used as a validation that the token is valid and the user has access. It may also include the optional Boolean parameter "SupportsContainers" in a JSON body.

Alternately, as shown in FIG. 6, the client request may include a "GetRootContainer" request that may include the following form: "GET /wopi/ecosystem/root_container_pointer". In at least some implementations the "GetRootContainer" request may be used by a client device to obtain a reference to the root container of the host, which in at least some implementations is equivalent to a reference to an ecosystem of the host, and from which the client device can perform one or more operations (e.g. "EnumerateChildren" request) to navigate a container hierarchy (i.e. browse) that may exist within the ecosystem.

In response to the above-noted ecosystem-related requests, the host may respond by issuing a "GetNewAccessToken" response having the following form: "POST/wopi/ecosystem". As shown in FIG. 6 the "POST /wopi/ecosystem" operation may result in one or more additional operations (or "overrides"), including a "GET_NEW_ACCESS_TOKEN" operation. In at least some implementations, the "GET_NEW_ACCESS_TOKEN" operation may be used by the host to retrieve a fresh protocol access token for a given resource (i.e. an ecosystem, a container, a file, etc.) provided that the client device 110 has successfully passed the host's standard authentication scheme (first part 310) and already has a valid token (or other access information) from that authentication scheme (provided at 318). In alternate implementations, however, there may be other ways to get into a protocol in accordance with the present disclosure with a valid access token (or other access information) and know the location of the ecosystem URL, and once a client device has those, the client device can call such a protocol, regardless of whether the client device started with the "bootstrapper" authentication process (e.g. FIG. 3) or not. Thus, it will be appreciated that in at least some implementations, a process in accordance with the present disclosure is not necessarily limited to accessing the protocol in accordance with the present disclosure only via the "bootstrapper"-initiated process (e.g. FIG. 3). For example, in at least some implementations, existing applications (e.g. Microsoft Office® web apps), which may not know how to use the above-described bootstrapper process, may still update access tokens (as may be done via the bootstrapper) using their own authentication mechanism.

FIG. 7 shows an embodiment of a response 700 by a host to a request for a new access token, including a protocol-associated access token 702 and an "AccessTokenExpiry" parameter 704 that indicates when the protocol-associated access token 702 expires.

In at least some implementations, the host may respond by issuing a "GetFileWopiSrc" response having the following form: "POST /wopi/ecosystem". As in the "bootstrapper" equivalent, the host may require a client device to include a URL in the host namespace as an input. For example, in at least some implementations, the URL in the host namespace may be passed as a header whose name may be "X-WOPI-HostNativeFileName." Again, as shown in FIG. 6 the "POST/wopi/ecosystem" operation may result in an additional operation (or "override") referred to as "GET_WOPI_SRC_WITH_ACCESS_TOKEN". FIG. 8 shows an embodiment of a response 800 by a host to a request for a protocol source. As shown in FIG. 8, the response 800 may include a URL 802 that represents a protocol source value, with a protocol-associated access token 804 appended.

Referring again to FIG. 2, in at least some implementations, the host determines (at 208) that a request received from the client device (at 206) is a container-related request by determining that the request includes a "container" endpoint. FIG. 9 shows a table of possible operations 900 that may be involved when the request received at the host is a container-related request. It will be appreciated that one or more of the operations shown in FIG. 9 may be used to facilitate browsing of one or more containers (or other container-related operations) stored by the host using the client device. For example, in at least some implementations, the request received by the host from the client device may include a "CheckContainerInfo" request that may have the following form: "GET /wopi/containers/<containerid>". In at least some implementations, the "CheckContainerInfo" request includes a string (e.g. "<containerid>") that specifies a container ID of a container managed by the host, and is intended to return information about the container and a user's permissions on that container. More specifically, in at least some implementations, a host's response to the "CheckContainerInfo" request from the client device may include one or more of the following information: (a) a "HostUrl" that may include a URL to a webpage for the container, (b) an "IsEduUser" parameter that may include a Boolean value indicating whether the user is an education user or not, (c) a "LicenseCheckForEditIsEnabled" parameter that may include a Boolean value indicating whether the user is a business user or not, (d) a "SharingUrl" parameter that may include a URL to a webpage to allow the user to control sharing of the container, (e) a "UserCanCreateChildContainer" parameter that may include a Boolean value that indicates the user has permission to create a new container in the container, (f) a "UserCanCreateChildFile" parameter that may include a Boolean value that indicates the user has permission to create a new file in the container, (g) a "UserCanDelete" parameter that may include a Boolean value that indicates the user has permission to delete the container, or (h) a "UserCanRename" parameter that may include a Boolean value that indicates the user has permission to rename the container.

Alternately, as further shown in FIG. 9, in at least some implementations, the request from the client device may include an "EnumerateChildren" request that may have the following form: "GET /wopi/containers/<containerid>/children". In at least some implementations, the "EnumerateChildren" request includes a string (e.g. "<containerid>") that specifies a container ID of a container managed by the host, and a protocol access token that the host will use to determine whether the request is authorized, and is intended to return information about the immediate children of the specified container.

For example, FIG. 10 shows an embodiment of a response 1000 by a host to a request to enumerate children of a container. More specifically, in at least some implementations, a host's response 1000 to the "EnumerateChildren" request from the client device may include one or more of the following information: (a) a "ChildContainers" array 1010 which may include one or more JavaScript Object Notation (JSON)-formatted objects that contain (a) a "Name" of a child container (e.g. 1014, 1018), and (b) a URL to the corresponding child container (e.g. 1012, 1016), and may include a valid access token (e.g. 1013, 1017) for accessing the child container. Similarly, in at least some implementations, a host's response to the "EnumerateChildren" request from the client device may include one or more of the following information: (a) a "ChildFiles" array 1020 which may include one or more JSON-formatted objects that contain (a) a "Name" of a child file 1024, (b) a "Size" parameter 1028 that indicates a size of the corresponding file, (c) a URL 1022 to the corresponding file, and may include a valid access token 1023 for accessing the child file, (d) a "Version" parameter 1026 that may indicate a version of the corresponding child file, or (e) a "LastModifiedTime" parameter 1030 that indicates when the corresponding child file was last modified (or saved).

In addition, with continued reference to FIG. 9, in at least some implementations, the request from the client device may include an "EnumerateAncestors" request that may have the following form: "GET /wopi/containers/<containerid>/ancestry". In at least some implementations, the "EnumerateAncestors" request includes a string (e.g. "<containerid>") that specifies a container ID of a container managed by the host, and a protocol access token that the host will use to determine whether the request is authorized, and is intended to return information about all of the parents of the specified container, up to and including the root container.

FIG. 11 shows an embodiment of a response 1100 by a host to a request to enumerate ancestors of a container. More specifically, in at least some implementations, a host's response 1100 to the "EnumerateAncestors" request from the client device may include one or more of the following information: (a) a "AncestorsWithRootFirst" array 1110 which may include one or more JSON-formatted objects that contain (a) a "Name" of a container without a path (e.g. 1114, 1118, 1122), and (b) a URL to the corresponding container(s) without a path (e.g. 1112, 1116, 1120), and may include a valid access token (e.g. 1113, 1117, 1121) for accessing the corresponding container. In at least some implementations, the "AncestorsWithRootFirst" array 1110 is ordered such that the ancestor container closest to the root is the first element, and if there are no ancestor containers, the array may be an empty array.

As further shown in FIG. 9, in at least some implementations, the request from the client device may include a "GetEcosystem" request that may have the following form: "GET/wopi/containers/<containerid>/ecosystem_pointer." In at least some implementations, the "GetEcosystem" request includes a string (e.g. "<containerid>") that specifies a container ID of a container managed by the host, and a protocol access token that the host will use to determine whether the request is authorized, and is intended to return information about the host's ecosystem endpoint for the corresponding container. In at least some implementations, the response by the host includes a string URL for the host's ecosystem endpoint, and may include a protocol-associated access token appended thereto.

As further shown in FIG. 9, in at least some implementations, the client device may request a "RenameContainer" operation to attempt to rename a container. It will be appreciated that, in at least some implementations, the override header is the way the client lets the host know it wants to rename the container (e.g. as opposed to just learning about the container or performing other operations on the container). The host may respond to a "RenameContainer" operation with the following URL form: "POST/ wopi/containers/<containerId>" wherein the string "<containerId>" specified a container ID of a container managed by the host. The host may require an access token that the host may use to determine whether a client device's request to rename a container is authorized. If authorized, the host may rename the specified container. In at least some implementations, the host may provide a response that includes the string name of the renamed container.

Similarly, in at least some implementations, the client device may request a "DeleteContainer" operation to attempt to delete a container. Again, in at least some implementations, the override header is the way the client lets the host know it wants to delete the container (e.g. as opposed to just learning about the container or performing other operations on the container). The host may respond to a "DeleteContainer" operation having the following URL form: "POST /wopi/containers/<containerId>" wherein the string "<containerId>" specified a container ID of a container managed by the host. The host may require an access token that the host may use to determine whether a client device's request to delete a container is authorized. If authorized, the host may delete the specified container.

In at least some implementations, the client device may request a "CreateChildContainer" operation to attempt to create a new child container. Again, in at least some implementations, the override header is the way the client lets the host know it wants to create the child container. The host may respond to a "CreateChildContainer" operation having the following URL form: "POST/wopi/containers/<containerId>" wherein the string "<containerId>" specified a container ID of a container managed by the host. The host may require an access token that the host may use to determine whether a client device's request to create a new child container is authorized. If authorized, the host may create a new child container. Also, in at least some implementations, the host may return JSON to the client that indicates the URL to the new object (e.g. child container) that was created (along with an access token to use with that new object), In addition, in at least some implementations, the client device may request a "CreateChildFile" operation to attempt to create a new child file. Again, in at least some implementations, the override header is the way the client lets the host know it wants to create the child file (e.g. as opposed to just learning about the container or performing other operations on the container). The host may respond to a "CreateChildFile" operation having the following URL form: "POST /wopi/containers/<containerId>" wherein the string "<containerId>" specified a container ID of a container managed by the host. The host may require an access token that the host may use to determine whether a client device's request to create a new child file is authorized. If authorized, the host may create a new child file. Also, in at least some implementations, the host may return JSON to the client that indicates the URL to the new object (e.g. child file) that was created (along with an access token to use with that new object), Referring again to FIG. 2, in at least some implementations, the host determines (at 208) that a request received from the client device (at 206) is a file-related request by determining that the request includes a "file" endpoint. FIG. 12 shows a table of possible operations that may be involved when the request received at the host (at 206) is a file-related request. For example, in at least some implementations, the request received by the host from the client device may include a "GetEcosystem" request that may have the following form: "GET /wopi/files/<fileId>/ecosystem_ pointer", wherein "<fileId>" is a string that specifies a file ID of a file managed by the host. In at least some implementations, the host may respond to the "GetEcosystem" request by returning a string URL for the host's ecosystem endpoint, with a protocol access token appended.

In addition, in at least some implementations, the request received by the host from the client device may include a "GetLock" request that may have the following form: "GET/ wopi/files/<fileId>", wherein "<fileId>" is a string that specifies a file ID of a file managed by the host. The "GetLock" request is intended to retrieve a lock on a file. In at least some implementations, if the file is currently not locked, the host may respond to the "GetLock" request by returning an empty string, and if the file is currently locked, the host should include a response that contains the value of the current lock on the file. In at least some implementations, the "lock" may prevents anyone else from changing the file while a client device (or particular user) has it locked, which means there's no risk of a full file write blowing away some other user's changes. Secondly, the lock value itself is a string, which can be used to track some minor bits of state by the clients (e.g. an app may use it to keep track of which machine is working on the file at the moment).

As further shown in FIG. 12, in at least some implementations, the request received by the host from the client device may include an "EnumerateAncestors" request that may have the following form: "GET /wopi/files/<fileId>/ ancestry", wherein "<fileId>" is a string that specifies a file ID of a file managed by the host. The "EnumerateAncestors" request is intended to retrieve the ancestry of a file. FIG. 13 shows an embodiment of a response 1300 by a host to a request to enumerate ancestors of a file. In at least some implementations, the host may respond to the "EnumerateAncestors" request by returning an array 1310 of JSON-formatted objects that contain (a) a "Name" of a file without a path (e.g. 1314, 1318, 1322), and (b) a URL to the corresponding file(s) without a path (e.g. 1312, 1316, 1320), and may include a valid access token (e.g. 1313, 1317, 1321) for accessing the corresponding file.

Techniques and technologies for protocols for accessing hosts as disclosed herein may considerably improve accessibility and functionality of user devices remotely accessing files and other data structures on remote systems, and may do so in a manner that improves the efficiency and operability of networked systems in comparison with conventional networked systems. For example, in at least some implementations, users that use applications operating on a user's client device, both native applications as well as web-based applications, often desire to browse for files stored on a remote host (e.g. server), open those files, and save the changes back to the host. Implementations of protocols for accessing hosts in accordance with the present disclosure enable a host to become "browseable" by any client device that knows how to communicate via the protocol. Thus, a protocol-enabled client device can browse a "container" structure that exists on the host, open files from that host, and save changes directly back to the host.

Thus, the desired operations may be performed efficiently from a remote client device without the need for a user to directly engage the remote host and log in as a user on the host to perform the desired operations directly on the host, and the computational resources associated with opening, engaging, and maintaining a direct engagement with the remote host in accordance with conventional techniques are reduced or eliminated.

In addition, in at least some implementations, protocols for accessing hosts in accordance with the present disclosure may also provide an enabling ability for clients to bridge between the host's native authentication schemes (and file namespaces) and protocols for accessing hosts in accordance with the present disclosure. For example, if a host receives a link to a file expressed in a host namespace (e.g. http://myhost/mattsfiles/cooldocs/doc2.docx) and the host wants to let a client be able to open and operate on that document, the client would normally need to interoperate (or interact) with whatever native API the host provided, of which there are many varieties of varying degrees of functionality and little commonality. Typically, this makes it very hard for clients to interop with many hosts, and makes it hard for a host to interoperate with many clients. Techniques and technologies in accordance with the present disclosure, however, solve this problem by enabling hosts that either already speak a protocol in accordance with the present disclosure (or want to start speaking a protocol in accordance with the present disclosure) with one or more clients that know how to speak a protocol in accordance with the present disclosure, both by navigating the authentication boundary (e.g. the "bootstrapper" process described herein), but also by navigating the namespace boundary. For example, the string "http://myhost/mattsfiles/cooldocs/doc2.docx" has meaning in the host namespace, but not in a protocol in accordance with the present disclosure, and existing hosts already have URL namespaces and they can't switch everything to a namespace used by a protocol in accordance with the present disclosure due to incompatibilities, so a way to translate that as well as the authentication is needed. Protocols as disclosed herein make it possible for the hosts to interoperate with clients over a protocol in accordance with the present disclosure while restricting the use of the protocol namespace to just this specific usage, rather than having to leak the protocol namespace throughout their external surface.

In addition, techniques and technologies in accordance with the present disclosure provide a way for applications to use existing authentication/authorization mechanisms to initially retrieve access tokens (or other access mechanisms) that can then be converted to protocol-specific access tokens that are used by the client device to access files on the host, thereby providing improved flexibility for both native applications and web-based applications to perform the desired browsing and file accessing operations on the host. Because such protocols advantageously enable applications to use existing authentication/authorization mechanisms to initially retrieve access mechanisms (e.g. tokens) that can then be converted to protocol-specific access tokens that are used by the client device to access files on the host, the integration of protocols in accordance with the present disclosure may be accomplished relatively seamlessly, with less modification of the application's authentication capabilities, enabling applications having existing authentication structures to be economically and efficiently used as an entry point to protocols in accordance with the present disclosure.

It will be appreciated that techniques and technologies for protocols for accessing hosts in accordance with the present disclosure are not necessarily limited to the particular embodiments described above with reference to FIGS. 1-13. More specifically, the embodiments described herein are not intended to be exhaustive of all possible embodiments in accordance with the present disclosure, and that additional embodiments may be conceived based on the subject matter disclosed herein. For example, it should be appreciated that at least some of the various components and aspects of the described embodiments may be eliminated to create additional embodiments, or may be variously combined or re-ordered to create still further embodiments. Accordingly, the description and discussion of particular embodiments disclosed herein should be viewed as being representative, and that additional embodiments within the spirit and scope of the present disclosure may be readily conceived based on the disclosure herein.

In general, techniques and technologies disclosed herein for protocols for accessing hosts may be described in the general context of computer code or machine-useable instructions, including computer-executable instructions such as program modules, being executed by a computer or other device. Generally, program modules including routines, programs, objects, components, data structures, etc., refer to code that perform particular tasks or implement particular abstract data types. Various embodiments of the invention may be practiced in a variety of system configurations, including hand-held devices, consumer electronics, general-purpose computers, more specialty computing devices, etc. In addition, various embodiments of the invention may also be practiced in distributed computing environments (e.g. cloud-based computing systems) where tasks are performed by remote-processing devices that are linked through a communications network.

Figure 14:
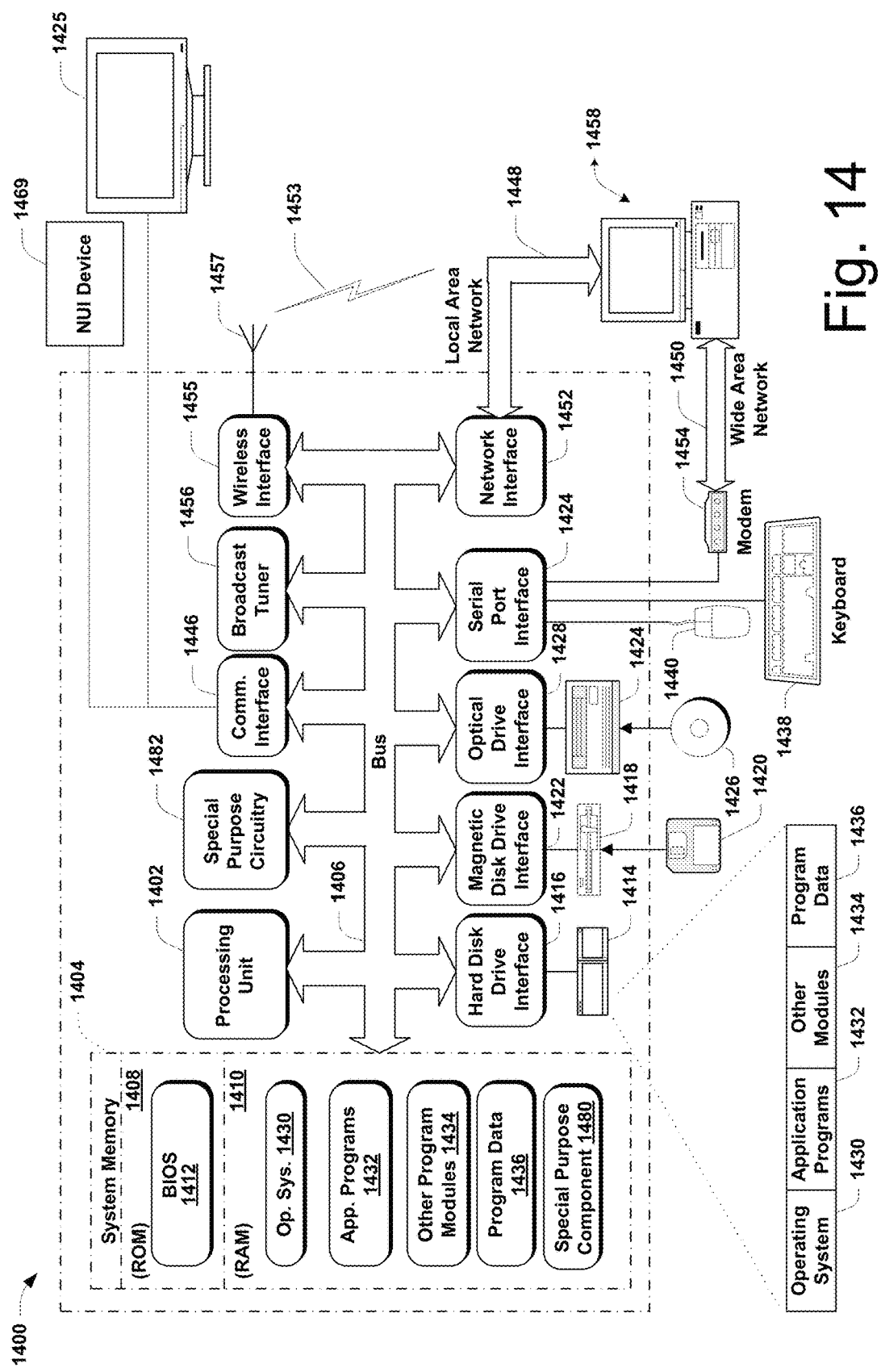
FIG. 14 shows an embodiment of a computer system environment for implementing protocols for accessing hosts.

Furthermore, techniques and technologies disclosed herein for protocols for accessing hosts may be implemented on a wide variety of devices and platforms. For example, FIG. 14 shows an embodiment of a computer system 1400 that may be employed for protocols for accessing hosts in accordance with the present disclosure. As shown in FIG. 14, the example computer system environment 1400 includes one or more processors (or processing units) 1402, special purpose circuitry 1482, memory 1404, and a bus 1406 that operatively couples various system components, including the memory 1404, to the one or more processors 1402 and special purpose circuitry 1482 (e.g., Application Specific Integrated Circuitry (ASIC), Field Programmable Gate Array (FPGA), etc.).

The bus 1406 may represent one or more of any of several types of bus structures, including a memory bus or memory controller, a peripheral bus, an accelerated graphics port, and a processor or local bus using any of a variety of bus architectures. In at least some implementations, the memory 1404 includes read only memory (ROM) 1408 and random access memory (RAM) 1410. A basic input/output system (BIOS) 1412, containing the basic routines that help to transfer information between elements within the system 1400, such as during start-up, is stored in ROM 1408.

The example system environment 1400 further includes a hard disk drive 1414 for reading from and writing to a hard disk (not shown), and is connected to the bus 1406 via a hard disk driver interface 1416 (e.g., a SCSI, ATA, or other type of interface). A magnetic disk drive 1418 for reading from and writing to a removable magnetic disk 1420, is connected to the system bus 1406 via a magnetic disk drive interface 1422. Similarly, an optical disk drive 1424 for reading from or writing to a removable optical disk 1426 such as a CD ROM, DVD, or other optical media, connected to the bus 1406 via an optical drive interface 1428. The drives and their associated computer-readable media may provide nonvolatile storage of computer readable instructions, data structures, program modules and other data for the system environment 1400. Although the system environment 1400 described herein employs a hard disk, a removable magnetic disk 1420 and a removable optical disk 1426, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

The computer-readable media included in the system memory 1400 can be any available or suitable media, including volatile and nonvolatile media, and removable and non-removable media, and may be implemented in any method or technology suitable for storage of information such as computer-readable instructions, data structures, program modules, or other data. More specifically, suitable computer-readable media may include random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information. As used herein, the term "computer-readable media" is not intended to include transitory signals.

As further shown in FIG. 14, a number of program modules may be stored on the memory 1404 (e.g., the ROM 1408 or the RAM 1410) including an operating system 1430, one or more application programs 1432, other program modules 1434, and program data 1436 (e.g., the data store 1420, image data, audio data, three dimensional object models, etc.). Alternately, these program modules may be stored on other computer-readable media, including the hard disk, the magnetic disk 1420, or the optical disk 1426. For purposes of illustration, programs and other executable program components, such as the operating system 1430, are illustrated in FIG. 14 as discrete blocks, although it is recognized that such programs and components reside at various times in different storage components of the system environment 1400, and may be executed by the processor(s) 1402 or the special purpose circuitry 1482 of the system environment 1400.

A user may enter commands and information into the system environment 1400 through input devices such as a keyboard 1438 and a pointing device 1440. Other input devices (not shown) may include a microphone, joystick, game pad, satellite dish, scanner, or the like. Still other input devices, such as a Natural User Interface (NUI) device 1469, or user interface 1425, include or involve one or more aspects of a Natural User Interface (NUI) that enables a user to interact with the system environment 1400 in a "natural" manner, free from artificial constraints imposed by conventional input devices such as mice, keyboards, remote controls, and the like. For example, in at least some embodiments, the NUI device 1469 may rely on speech recognition, touch and stylus recognition, one or more biometric inputs, gesture recognition both on screen and adjacent to the screen, air gestures, head and eye (or gaze) tracking, voice and speech, vision, touch, hover, gestures, machine intelligence, as well as technologies for sensing brain activity using electric field sensing electrodes (EEG and related methods) to receive inputs. In addition, in at least some embodiments, an NUI may involve or incorporate one or more aspects of touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface.

More specifically, in at least some embodiments, the NUI device 1469 may be configured to detect one or more contacts, or one or more non-contacting gestures that are indicative of one or more characteristics, selections or actions by a user. For example, in at least some implementations, the NUI device 1469 may include a non-contact gesture detection device operable to detect gestures such as a Kinect® system commercially-available from the Microsoft Corporation, a Wii® system commercially-available from Nintendo of America, Inc., a HoloLens™ system commercially-available from the Microsoft Corporation, or any of a variety of eye or gaze tracking devices, including, for example, the devices, systems, and technologies of Tobii Technology, Inc. (e.g. Pro Glasses 2, StarVR, Tobii EyeChip, Model 1750 Eye Tracker, etc.), or those of Xlabs Pty Ltd., or any other suitable devices, systems, and technologies. In this way, the NUI device 1469 may be configured to detect at least one of contacts or non-contacting gestures by a user that are indicative of characteristics, selections or actions for performing operations as described above.

These and other input devices are connected to the processing unit 1402 and special purpose circuitry 1482 through an interface 1442 or a communication interface 1446 (e.g. video adapter) that is coupled to the system bus 1406. A user interface 1425 (e.g., display, monitor, or any other user interface device) may be connected to the bus 1406 via an interface, such as a video adapter 1446. In addition, the system environment 1400 may also include other peripheral output devices (not shown) such as speakers and printers.

The system environment 1400 may operate in a networked environment using logical connections to one or more remote computers (or servers) 1458. Such remote computers (or servers) 1458 may be a personal computer, a server, a router, a network PC, a peer device or other common network node. The logical connections depicted in FIG. 14 include one or more of a local area network (LAN) 1448 and a wide area network (WAN) 1450. Such networking environments are commonplace in offices, enterprise-wide computer networks, intranets, and the Internet. In this embodiment, the system environment 1400 also includes one or more broadcast tuners 1456. The broadcast tuner 1456 may receive broadcast signals directly (e.g., analog or digital cable transmissions fed directly into the tuner 1456) or via a reception device (e.g., via an antenna 1457, a satellite dish, etc.).

When used in a LAN networking environment, the system environment 1400 may be connected to the local area network 1448 through a network interface (or adapter) 1452. When used in a WAN networking environment, the system environment 1400 typically includes a modem 1454 or other means (e.g., router) for establishing communications over the wide area network 1450, such as the Internet. The modem 1454, which may be internal or external, may be connected to the bus 1406 via the serial port interface 1442. Similarly, the system environment 1400 may exchange (send or receive) wireless signals 1453 with one or more remote devices using a wireless interface 1455 coupled to a wireless communicator 1457 (e.g., an antenna, a satellite dish, a transmitter, a receiver, a transceiver, a photoreceptor, a photodiode, an emitter, a receptor, etc.).

In a networked environment, program modules depicted relative to the system environment 1400, or portions thereof, may be stored in the memory 1404, or in a remote memory storage device. More specifically, as further shown in FIG. 14, a special purpose component 1480 may be stored in the memory 1404 of the system environment 1400. The special purpose component 1480 may be implemented using software, hardware, firmware, or any suitable combination thereof. In cooperation with the other components of the system environment 1400, such as the processing unit 1402 or the special purpose circuitry 1482, the special purpose component 1480 may be operable to perform one or more implementations of techniques described above (e.g., example process 200 of FIG. 2, process 300 of FIG. 3, etc.).

Generally, application programs and program modules executed on the system environment 1400 may include routines, programs, objects, components, data structures, etc., for performing particular tasks or implementing particular abstract data types. These program modules and the like may be executed as a native code or may be downloaded and executed, such as in a virtual machine or other just-in-time compilation execution environments. Typically, the functionality of the program modules may be combined or distributed as desired in various implementations.

In view of the disclosure of techniques and technologies for protocols for accessing hosts as disclosed herein, a few representative embodiments are summarized below. It should be appreciated that the following summary of representative embodiments is not intended to be exhaustive of all possible embodiments, and that additional embodiments may be readily conceived from the disclosure of techniques and technologies provided herein.

For example, in at least some embodiments, a system includes a processing component operatively coupled to a memory; and a host protocol component stored on the memory, the host protocol component including one or more instructions that when executed by the processing component perform one or more operations including: receiving at the host a request from the client device, the request including a Uniform Resource Locator (URL) string locating at least one of a container or an ecosystem stored by the host; determining using at least a portion of the URL string whether the request is at least one of a container-related request or an ecosystem-related request; generating a response at the host including information responsive to the request, the information including the URL string locating the at least one of the container or the ecosystem, and at least one response parameter corresponding to the request and associated with the at least one of the container or the ecosystem; and transmitting the response from the host to the client device.

In at least some embodiments, the request received from the client device further includes an access token, and wherein the host protocol component further includes one or more instructions that when executed perform one or more operations comprising: determining whether the request is authorized to be performed based at least partially on the access token. Similarly, in at least some embodiments, the host protocol component further includes one or more instructions that when executed perform one or more operations comprising: receiving an authentication request from the client device requesting to be authenticated with the host, the authentication request including authentication information; and authenticating the client device at least partially based on the authentication information.

In some further embodiments, the host protocol component further includes one or more instructions that when executed perform one or more operations comprising: receiving an authentication request from the client device requesting to be authenticated with the host, the authentication request including authentication information; performing an initial authentication using a standard authentication scheme of the host at least partially based on the authentication information; providing at least one standard access token to the client device based on the standard authentication scheme; receiving a protocol-related authentication request from the client device, the protocol-related authentication request including the at least one standard access token; and providing protocol-related information and at least one protocol-related access token to the client device based at least partially on the protocol-related authentication request including the at least one standard access token.

In further implementations, the host protocol component further includes one or more instructions that when executed perform one or more operations comprising: determining that the protocol-related access token is at or near expiration; and retrieving a fresh protocol-related access token based at least partially on the at least one standard access token. Similarly, in at least some implementations, the host protocol component further includes one or more instructions that when executed perform one or more operations comprising: determining that the protocol-related access token is at or near expiration; and retrieving a fresh protocol-related access token based at least partially on the at least one standard access token without requiring re-performing the initial authentication using the standard authentication scheme.

In addition, in at least some embodiments, determining using at least a portion of the URL string whether the request is at least one of a container-related request or an ecosystem-related request comprises: determining using at least an endpoint portion of the URL string whether the request is at least one of a container-related request or an ecosystem-related request. In at least some alternate embodiments, determining using at least a portion of the URL string whether the request is at least one of a container-related request or an ecosystem-related request comprises: determining using at least a portion of the URL string that the request includes a root-level information that enables at least one of a browsing or a navigating command related to at least one of a container or an ecosystem.

Similarly, in at least some embodiments, receiving at the host a request from the client device, the request including a Uniform Resource Locator (URL) string locating at least one of a container or an ecosystem stored by the host comprises: receiving at the host a request from the client device to at least one of enumerate children or enumerate ancestors of a container stored by the host, the request including a Uniform Resource Locator (URL) string locating the container stored by the host.

In still other embodiments, receiving at the host a request from the client device, the request including a Uniform Resource Locator (URL) string locating at least one of a container or an ecosystem stored by the host comprises: receiving at the host a request from the client device related to browsing an ecosystem stored by the host, the request including a Uniform Resource Locator (URL) string locating the ecosystem stored by the host. In at least some further embodiments, receiving at the host a request from the client device related to browsing an ecosystem stored by the host, the request including a Uniform Resource Locator (URL) string locating the ecosystem stored by the host comprises: receiving at the host a request from the client device to get a root container of an ecosystem stored by the host, the request including a Uniform Resource Locator (URL) string locating the ecosystem stored by the host. And in still further embodiments, generating a response at the host including information responsive to the request, the information including the URL string locating the at least one of the container or the ecosystem, and at least one response parameter corresponding to the request and associated with the at least one of the container or the ecosystem, comprises: generating a response at the host including information responsive to the request, the information including an array of objects including at least a name of the at least one of the container or the ecosystem, a URL corresponding to the at least one of the container or the ecosystem, and a valid access token for accessing the at least one of the container or the ecosystem.

Alternately, in at least some embodiments, a system, includes a processing component operatively coupled to a memory; and a host protocol component stored on the memory, the host protocol component including one or more instructions that when executed by the processing component perform one or more operations including: receiving an authentication request from a client device requesting to be authenticated with a host, the authentication request including authentication information; performing an initial authentication using a standard authentication scheme of the host at least partially based on the authentication information; providing at least one standard access information to the client device based on the standard authentication scheme; receiving a protocol-related authentication request from the client device, the protocol-related authentication request including the at least one standard access information; providing protocol-related information and at least one protocol-related access token to the client device based at least partially on the protocol-related authentication request including the at least one standard access information; receiving at the host a request from the client device, the request including a Uniform Resource Locator (URL) string locating at least one of a container or an ecosystem stored by the host and the protocol-related access token; determining using at least a portion of the URL string whether the request is at least one of a container-related request or an ecosystem-related request; determining whether the request is authorized to be performed based at least partially on the protocol-related access token; and if the request is authorized: generating a response at the host including information responsive to the request, the information including the URL string locating the at least one of the container or the ecosystem, and at least one response parameter corresponding to the request and associated with the at least one of the container or the ecosystem; and transmitting the response from the host to the client device.

In at least some embodiments, receiving at the host a request from the client device, the request including a Uniform Resource Locator (URL) string locating at least one of a container or an ecosystem stored by the host comprises: receiving at the host a request from the client device, the request include a URL string that includes a root-level information that refers to a collection of objects. And in some further embodiments, receiving at the host a request from the client device related to browsing a container stored by the host, the request including a Uniform Resource Locator (URL) string locating the container stored by the host comprises: receiving at the host a request from the client device to at least one of enumerate children or enumerate ancestors of a container stored by the host, the request including a Uniform Resource Locator (URL) string locating the container stored by the host.

Similarly, in at least some embodiments, providing at least one standard access information to the client device based on the standard authentication scheme comprises: providing at least one standard access token to the client device based on the standard authentication scheme.

And in some further embodiments, generating a response at the host including information responsive to the request, the information including the URL string locating the at least one of the container or the ecosystem, and at least one response parameter corresponding to the request and associated with the at least one of the container or the ecosystem, comprises: generating a response at the host including information responsive to the request, the information including an array of JavaScript Object Notation (JSON)-formatted objects including at least a name of the at least one of the container or the ecosystem, a URL corresponding to the at least one of the container or the ecosystem, and a valid access token for accessing the at least one of the container or the ecosystem.

In still further embodiments, the host protocol component further includes one or more instructions that when executed perform one or more operations comprising: determining that the protocol-related access token is at or near expiration; and retrieving a fresh protocol-related access token based at least partially on the at least one standard access token without requiring re-performing the initial authentication using the standard authentication scheme In addition, in at least some embodiments, a method for communicating between a client device and a host includes authenticating the client device with the host, including providing at least one protocol-related access token to the client device; receiving at the host a request from the client device, the request including a Uniform Resource Locator (URL) string that includes a root-level information that locates at least one of a container or an ecosystem stored by the host and enables at least one of a browsing or a navigating command related to the at least one of the container or the ecosystem, and the at least one protocol-related access token; determining using at least a portion of the URL string whether the request is at least one of a container-related request or an ecosystem-related request; determining that the request from the client device is authorized based at least partially on the at least one protocol-related access token; if the request is authorized: generating a response at the host including information responsive to the request, the information including the URL string locating the at least one of the container or the ecosystem, and at least one response parameter corresponding to the request and associated with the at least one of the container or the ecosystem; and transmitting the response from the host to the client device.

In at least some embodiments, authenticating the client device with the host, including providing at least one protocol-related access token to the client device comprises: receiving an authentication request from the client device requesting to be authenticated with the host, the authentication request including authentication information; performing an initial authentication using a standard authentication scheme of the host at least partially based on the authentication information; providing at least one standard access information to the client device based on the standard authentication scheme; receiving a protocol-related authentication request from the client device, the protocol-related authentication request including the at least one standard access information; and providing protocol-related information and at least one protocol-related access token to the client device based at least partially on the protocol-related authentication request including the at least one standard access information.

CONCLUSION

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. It will be appreciated that the embodiments of techniques and technologies described above are not exhaustive of all possible embodiments considered to be within the scope of the present disclosure, and that additional embodiments may be conceived based on the subject matter disclosed herein. For example, in alternate embodiments one or more elements or components of the techniques and technologies described above may be re-arranged, re-ordered, modified, or even omitted to provide additional embodiments that are still considered to be within the scope of the present disclosure.

Alternately, or in addition, the techniques and technologies described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Although the subject matter has been described in language specific to structural features and/or acts, it is to be understood that the subject matter defined in the appended claims is not necessarily limited to the specific features or acts described. Rather, the specific features and acts described above are disclosed as examples of implementing the claims and other equivalent features and acts are intended to be within the scope of the claims. The various embodiments and implementations described above are provided by way of illustration only and should not be construed as limiting various modifications and changes that may be made to the embodiments and implementations described above without departing from the spirit and scope of the disclosure.

What is claimed is:

1. A system, comprising:
   a processing component operatively coupled to a memory; and
   a host protocol component stored on the memory, the host protocol component including one or more instructions that when executed by the processing component perform one or more operations including:
      providing at least one standard access token to a client device based on the client device successfully passing a standard authentication scheme;
      providing protocol-related information and at least one protocol-related access token to the client device based on the client device providing a protocol-related authentication request including the at least one standard access token;
      receiving at the host a request from the client device, the request including a Uniform Resource Locator (URL) string locating at least one of a container or an ecosystem stored by the host;
      determining using at least a portion of the URL string whether the request is at least one of a container-related request or an ecosystem-related request;
      generating a response at the host including information responsive to the request, the information including the URL string locating the at least one of the container or the ecosystem, and at least one response parameter corresponding to the request and associated with the at least one of the container or the ecosystem; and
      transmitting the response from the host to the client device.

2. The system of claim 1, wherein the request received from the client device further includes an access token, and wherein the host protocol component further includes one or more instructions that when executed perform one or more operations comprising:
   determining whether the request is authorized to be performed based at least partially on the access token.

3. The system of claim 1, wherein the host protocol component further includes one or more instructions that when executed perform one or more operations comprising:
   receiving an authentication request from the client device requesting to be authenticated with the host, the authentication request including authentication information; and
   authenticating the client device at least partially based on the authentication information.

4. The system of claim 1, wherein the host protocol component further includes one or more instructions that when executed perform one or more operations comprising:
   receiving an authentication request from the client device requesting to be authenticated with the host, the authentication request including authentication information;
   performing an initial authentication using a standard authentication scheme of the host at least partially based on the authentication information;

wherein providing the at least one standard access token to the client device based on the client device successfully passing the standard authentication scheme occurs after performing the initial authentication using the standard authentication scheme;

receiving a protocol-related authentication request from the client device, the protocol-related authentication request including the at least one standard access token; and wherein providing the protocol-related information and the at least one protocol-related access token to the client device based on the protocol-related authentication request including the at least one standard access token occurs after receiving the protocol-related authentication request.

5. The system of claim 4, wherein the host protocol component further includes one or more instructions that when executed perform one or more operations comprising:
 determining that the protocol-related access token is at or near expiration; and
 retrieving a fresh protocol-related access token based at least partially on the at least one standard access token.

6. The system of claim 4, wherein the host protocol component further includes one or more instructions that when executed perform one or more operations comprising:
 determining that the protocol-related access token is at or near expiration; and
 retrieving a fresh protocol-related access token based at least partially on the at least one standard access token without requiring re-performing the initial authentication using the standard authentication scheme.

7. The system of claim 1, wherein determining using at least a portion of the URL string whether the request is at least one of a container-related request or an ecosystem-related request comprises:
 determining using at least an endpoint portion of the URL string whether the request is at least one of a container-related request or an ecosystem-related request.

8. The system of claim 1, wherein determining using at least a portion of the URL string whether the request is at least one of a container-related request or an ecosystem-related request comprises:
 determining using at least a portion of the URL string that the request includes a root-level information that enables at least one of a browsing or a navigating command related to at least one of a container or an ecosystem.

9. The system of claim 1, wherein receiving at the host a request from the client device, the request including a Uniform Resource Locator (URL) string locating at least one of a container or an ecosystem stored by the host comprises:
 receiving at the host a request from the client device to at least one of enumerate children or enumerate ancestors of a container stored by the host, the request including a Uniform Resource Locator (URL) string locating the container stored by the host.

10. The system of claim 1, wherein receiving at the host a request from the client device, the request including a Uniform Resource Locator (URL) string locating at least one of a container or an ecosystem stored by the host comprises:
 receiving at the host a request from the client device related to browsing an ecosystem stored by the host, the request including a Uniform Resource Locator (URL) string locating the ecosystem stored by the host.

11. The system of claim 10, wherein receiving at the host a request from the client device related to browsing an ecosystem stored by the host, the request including a Uniform Resource Locator (URL) string locating the ecosystem stored by the host comprises:
 receiving at the host a request from the client device to get a root container of an ecosystem stored by the host, the request including a Uniform Resource Locator (URL) string locating the ecosystem stored by the host.

12. The system of claim 1, wherein generating a response at the host including information responsive to the request, the information including the URL string locating the at least one of the container or the ecosystem, and at least one response parameter corresponding to the request and associated with the at least one of the container or the ecosystem, comprises:
 generating a response at the host including information responsive to the request, the information including an array of objects including at least a name of the at least one of the container or the ecosystem, a URL corresponding to the at least one of the container or the ecosystem, and a valid access token for accessing the at least one of the container or the ecosystem.

13. A system, comprising:
 a processing component operatively coupled to a memory; and
 a host protocol component stored on the memory, the host protocol component including one or more instructions that when executed by the processing component perform one or more operations including:
  receiving an authentication request from a client device requesting to be authenticated with a host, the authentication request including authentication information;
  performing an initial authentication using a standard authentication scheme of the host at least partially based on the authentication information;
  providing standard access information to the client device based on the standard authentication scheme;
  receiving a protocol-related authentication request from the client device, the protocol-related authentication request including the standard access information;
  providing protocol-related information and at least one protocol-related access token to the client device based at least partially on the protocol-related authentication request including the standard access information;
  receiving at the host a request from the client device, the request including a Uniform Resource Locator (URL) string locating at least one of a container or an ecosystem stored by the host and the protocol-related access token;
  determining using at least a portion of the URL string whether the request is at least one of a container-related request or an ecosystem-related request;
  determining whether the request is authorized to be performed based at least partially on the protocol-related access token; and
  if the request is authorized:
   generating a response at the host including information responsive to the request, the information including the URL string locating the at least one of the container or the ecosystem, and at least one response parameter corresponding to the request and associated with the at least one of the container or the ecosystem; and
   transmitting the response from the host to the client device.

14. The system of claim 13, wherein receiving at the host a request from the client device, the request including a Uniform Resource Locator (URL) string locating at least one of a container or an ecosystem stored by the host comprises:
receiving at the host a request from the client device, the request include a URL string that includes a root-level information that refers to a collection of objects stored by the host.

15. The system of claim 14, wherein receiving at the host a request from the client device related to browsing a container stored by the host, the request including a Uniform Resource Locator (URL) string locating the container stored by the host comprises:
receiving at the host a request from the client device to at least one of enumerate children or enumerate ancestors of a container stored by the host, the request including a Uniform Resource Locator (URL) string locating the container stored by the host.

16. The system of claim 13, wherein providing at least one standard access information to the client device based on the standard authentication scheme comprises:
providing at least one standard access token to the client device based on the standard authentication scheme.

17. The system of claim 13, wherein generating a response at the host including information responsive to the request, the information including the URL string locating the at least one of the container or the ecosystem, and at least one response parameter corresponding to the request and associated with the at least one of the container or the ecosystem, comprises:
generating a response at the host including information responsive to the request, the information including an array of JavaScript Object Notation (JSON)-formatted objects including at least a name of the at least one of the container or the ecosystem, a URL corresponding to the at least one of the container or the ecosystem, and a valid access token for accessing the at least one of the container or the ecosystem.

18. The system of claim 13, wherein the host protocol component further includes one or more instructions that when executed perform one or more operations comprising:
determining that the protocol-related access token is at or near expiration; and
retrieving a fresh protocol-related access token based at least partially on the at least one standard access token without requiring re-performing the initial authentication using the standard authentication scheme.

19. A method for communicating between a client device and a host, comprising:
authenticating the client device with the host, the authenticating including:
providing at least one standard access token to the client device based on the client device successfully passing a standard authentication scheme;
providing protocol-related information and at least one protocol-related access token to the client device based on the client device providing a protocol-related authentication request including the at least one standard access token;
receiving at the host a request from the client device, the request including a Uniform Resource Locator (URL) string that includes a root-level information that locates at least one of a container or an ecosystem stored by the host and enables at least one of a browsing or a navigating command related to the at least one of the container or the ecosystem, and the at least one protocol-related access token;
determining using at least a portion of the URL string whether the request is at least one of a container-related request or an ecosystem-related request;
determining that the request from the client device is authorized based at least partially on the at least one protocol-related access token; and
if the request is authorized:
generating a response at the host including information responsive to the request, the information including the URL string locating the at least one of the container or the ecosystem, and at least one response parameter corresponding to the request and associated with the at least one of the container or the ecosystem; and
transmitting the response from the host to the client device.

20. The method of claim 19, wherein authenticating the client device with the host further comprises:
receiving an authentication request from the client device requesting to be authenticated with the host, the authentication request including authentication information;
performing an initial authentication using a standard authentication scheme of the host at least partially based on the authentication information;
wherein providing the at least one standard access information including the at least one standard access token to the client device based on the client device successfully passing the standard authentication scheme occurs after performing the initial authentication using the standard authentication scheme;
receiving a protocol-related authentication request from the client device, the protocol-related authentication request including the at least one standard access information; and
wherein providing the protocol-related information and the at least one protocol-related access token to the client device based on the protocol-related authentication request including the at least one standard access information occurs after receiving the protocol-related authentication request.

* * * * *